United States Patent
Hasebe et al.

(10) Patent No.: US 7,461,862 B2
(45) Date of Patent: Dec. 9, 2008

(54) AIRBAG AND AIRBAG SYSTEM

(75) Inventors: Masahiro Hasebe, Hikone (JP); Yukitoshi Narimoto, Oumihachiman (JP)

(73) Assignee: Takata Corporation, Tokyo (JP)

( * ) Notice: Subject to any disclaimer, the term of this patent is extended or adjusted under 35 U.S.C. 154(b) by 362 days.

(21) Appl. No.: 11/206,204

(22) Filed: Aug. 18, 2005

(65) Prior Publication Data

US 2006/0043707 A1   Mar. 2, 2006

Related U.S. Application Data

(63) Continuation-in-part of application No. 10/671,803, filed on Sep. 29, 2003, now Pat. No. 7,121,584.

(30) Foreign Application Priority Data

Aug. 24, 2004 (JP) ............................. 2004-243936

(51) Int. Cl.
   B60R 21/16 (2006.01)
   B60R 21/231 (2006.01)
(52) U.S. Cl. .............. 280/743.2; 280/730.1; 280/730.2; 280/743.1; 280/729; 280/728.1
(58) Field of Classification Search .............. 280/728.1, 280/729, 730.1, 730.2, 743.1, 743.2
   See application file for complete search history.

(56) References Cited

U.S. PATENT DOCUMENTS 3,879,056 A * 4/1975 Kawashima et al. ..... 280/743.2
5,213,361 A  5/1993 Satoh et al.
5,380,038 A * 1/1995 Hawthorn et al. ........ 280/730.1
6,536,800 B2 * 3/2003 Kumagai et al. ......... 280/743.1
6,595,549 B2 * 7/2003 Bohn et al. ............... 280/743.1
6,655,714 B2 * 12/2003 Fellhauer et al. ......... 280/743.1
6,802,534 B2  10/2004 Neupert
6,834,884 B2 * 12/2004 Gu ............................ 280/729
7,264,270 B2 * 9/2007 Miyata et al. ............ 280/743.2
2003/0057691 A1 * 3/2003 Tokita et al. ............. 280/743.2
2003/0141702 A1 * 7/2003 Keutz ....................... 280/728.1
2004/0145161 A1 * 7/2004 Hasebe et al. ............... 280/729
2004/0160048 A1  8/2004 Hasebe et al.
2004/0232681 A1  11/2004 Adomeit

FOREIGN PATENT DOCUMENTS

| EP | 1 452 403 | 9/2004 |
|---|---|---|
| JP | S49-23176 | 6/1974 |
| JP | H04-292239 | 10/1992 |
| JP | H06-278559 | 10/1994 |
| JP | 100719111 | 3/1998 |

* cited by examiner

Primary Examiner—Christopher P Ellis
Assistant Examiner—Jacob Meyer
(74) Attorney, Agent, or Firm—Manabu Kanesaka

(57) ABSTRACT

An airbag is inflated in a direction that a distal end thereof moves away from a base end thereof with gas ejected from an inflator disposed on the base end. The airbag includes a left airbag section to be inflated toward a left front of an occupant, and a right airbag section to be inflated toward a right front of the occupant. The airbag further includes a width limiting member for limiting lateral widths of the left airbag section and the right airbag section during inflation. The width limiting member pulls an upper part of at least one of the left airbag section and the right airbag section adjacent to a car body inwardly and downwardly.

11 Claims, 4 Drawing Sheets

AIRBAG AND AIRBAG SYSTEM

CROSS REFERENCE TO RELATED APPLICATION

This is a continuation in-part application of patent application Ser. No. 10/671,803 filed on Sep. 29, 2003 and issued on Oct. 17, 2006 as U.S. Pat. No. 7,121,584.

BACKGROUND OF THE INVENTION AND RELATED ART STATEMENT

The present invention relates to an airbag and an airbag system for protecting an occupant in a car crash and so on. In particular, the present invention relates to an airbag and an airbag system including a left airbag section and a right airbag section to be inflated on a left front and a right front of an occupant, respectively.

Japanese Patent Publication (Kokai) No. 04-292239 discloses an airbag for protecting an occupant in a car crash and so on, which includes a left airbag section and a right airbag section to be inflated on a left front and right front of an occupant, respectively, by a common inflator. In the airbag of the reference, distal ends of the left airbag section and the right airbag section are joined together with a tie panel.

The airbag is housed in a casing in a folded state and covered with a cover. When an inflator (gas generator) is activated to eject gas in a car crash, the airbag pushes the cover open to inflate toward the front of the occupant.

The inflator is arranged inside or outside a base end of the airbag. In an airbag system in which the inflator is arranged outside the base end of the airbag, gas ejected from the inflator is supplied into the airbag through a gas inlet at the base end of the airbag. When the inflator is arranged inside the base end of the airbag, the inflator may be entirely arranged in the airbag, or alternatively, a part of the inflator may be arranged in the airbag. The later example includes a structure in which a pair of slit-like openings is provided in the airbag, in which a rod-like inflator is inserted with both ends thereof projecting outside the airbag.

Patent Document 1: Japanese Patent Publication (Kokai) No. 04-292239

In the airbag including the left airbag section and the right airbag section disclosed in Japanese Patent Publication (Kokai) No. 04-292239, when the left airbag section and the right airbag section in an inflated state have large volumes, a high-capacity inflator is required to inflate the airbag at an early stage. Accordingly, it is an object of the present invention to provide an airbag and an airbag system in which a left airbag section and a right airbag section are inflated sufficiently at an early stage even when a capacity of an inflator is relatively low, thereby preventing interference with an A-pillar during the inflation.

In the airbag disclosed in Japanese Patent Publication (Kokai) No. 04-292239, the distal ends of the left airbag section and the right airbag section are joined together with a tie panel. Accordingly, when the airbag inflates, the tie panel receives a lateral center of an occupant body.

In the airbag disclosed in Japanese Patent Publication (Kokai) No. 04-292239, when the left airbag section and the right airbag section inflate, gas from the inflator flows more into one of the airbag sections than the other, so that the other airbag section might inflate later than the first airbag section.

In the airbag disclosed in the reference, the left airbag section and the right airbag section are joined together with a tie panel. Accordingly, even if one of the airbag sections inflates later than the other, the first inflating airbag section may pull the late inflating airbag section in the inflating direction with the tie panel to accelerate the inflation. However, since the tie panel connects the distal ends of the left airbag section and the right airbag section together, the first inflating airbag section can not sufficiently pull the late inflating airbag with the tie panel until it inflates to the distal end.

Accordingly, it is an object of the invention to provide an airbag and an airbag system in which an inflated left airbag section receives a left chest of an occupant and a right airbag section receives a right chest while a space of the inflated airbag faces a lateral center of the occupant chest.

It is another object of the invention to provide an airbag and an airbag system in which both of a left airbag section and a right airbag section are inflated smoothly and substantially evenly from an initial stage of inflation.

Further objects and advantages of the invention will be apparent from the following description of the invention.

SUMMARY OF THE INVENTION

In order to attain the objects described above, according to a first aspect of the present invention, an airbag is inflated in a direction that a distal end thereof moves away from a base end thereof with gas ejected from an inflator disposed on the base end thereof. The airbag includes a left airbag section to be inflated toward a left front of an occupant, and a right airbag section to be inflated toward a right front of the occupant. The airbag further includes a width limiting member for limiting lateral widths of the left airbag section and the right airbag section during inflation. The width limiting member pulls an upper part of at least one of the left airbag section and the right airbag section adjacent to a car body inwardly and downwardly.

According to a second aspect of the present invention, in the airbag in the first aspect, the width limiting member is a tether that joins the upper part of the bag adjacent to the car body with a vertical intermediate portion or a lower part of the bag opposite thereto.

According to a third aspect of the present invention, in the airbag in one of the first and second aspects, the distal ends of the left airbag section and the right airbag section are not joined with each other, and a space open to the occupant is formed between the distal ends of the left airbag section and the right airbag section when the airbag becomes an inflated state.

According to a fourth aspect of the present invention, in the airbag in one of the first to third aspects, the intermediate portions of the left airbag section and the right airbag section in the inflating direction are joined with each other.

According to a fifth aspect of the present invention, in the airbag in the fourth aspect, opposing portions of the left airbag section and the right airbag section are joined with each other with a connecting member extending in a direction of connection thereof.

According to a sixth aspect of the present invention, an airbag system includes the airbag according to the invention and an inflator for inflating the airbag.

In the airbag and the airbag system according to the invention, the lateral widths of the airbags in an inflated state are limited. Accordingly, even if a low-capacity inflator is adopted, the right airbag section and the left airbag section can be inflated sufficiently early. According to the invention, the upper part of the bag adjacent to the car body is pulled inwardly and downwardly. Accordingly, it is possible to prevent the upper part of the inflated bag adjacent to the car body from interfering with an A-pillar and adjacent members.

It is preferable that the width limiting member be a tether that joins the upper part of the bag adjacent to the car body with the intermediate portion or the lower part of the bag opposite thereto. By controlling the length of the tether, it is possible to easily set an inwardly and downwardly pulled amount of the upper part of the inflated airbag adjacent to the car body.

In the invention, the distal ends of the left airbag section and the right airbag section may not be joined with each other; and a space open to the occupant may be formed between the distal ends of the left airbag section and the right airbag section when the airbag becomes an inflated state.

When the airbag is inflated, the left airbag section receives the left chest of the occupant and the right airbag section received the right chest. The left and right chests have hard and strong ribs. The airbag receives and absorbs an impact of the occupant via the ribs. With the airbag in an inflated state, a space is produced between the distal ends of the right airbag section and the left airbag section. Breastbones at a center of the breast of the occupant face the space. Accordingly, when the body of the occupant strikes against the airbag, the breastbones receive little reaction force from the airbag, thereby receiving little load.

In the invention, the intermediate portions of the left airbag section and the right airbag section in the inflating direction are joined with each other.

With the intermediate portions joined together, even if one of the airbag sections inflates later than the other, the first inflating airbag section pulls the other late inflating airbag section to accelerate its inflation. Moreover, the intermediate portions of the left airbag section and the right airbag section in the inflating direction are joined with each other. Accordingly, the bag that starts inflation first pulls the other late inflating bag in the inflating direction in the initial stage of inflation halfway through inflation. Thus, both of the left airbag section and the right airbag section can be inflated smoothly and substantially evenly from the initial stage of inflation.

In the airbag in which the intermediate portions of the left airbag section and the right airbag section in the inflating direction are joined together, the opposing portions of the left airbag section and the right airbag section may be joined with each other with the connecting member extending in the direction of connection thereof. With such a structure, the distance between the left airbag section and the right airbag section in an inflated state can be limited by the length of the connecting member.

BRIEF DESCRIPTION OF THE DRAWINGS

FIGS. 1(a) and 1(b) are schematic views showing an airbag according to an embodiment of the invention, wherein FIG. 1(a) is a perspective view in an inflated state and FIG. 1(b) is a sectional view taken along lines 1(b)-1(b) in FIG. 1(a);

FIGS. 4(a) and 4(b) are views of the airbag, wherein FIG. 4(a) is an exploded perspective view and FIG. 4(b) is an enlarged view of an essential part thereof shown in FIG. 4(a);

DETAILED DESCRIPTION OF PREFERRED EMBODIMENTS

Hereunder, embodiments of the present invention will be described in detail with reference to the attached drawings.

Figure 1A:
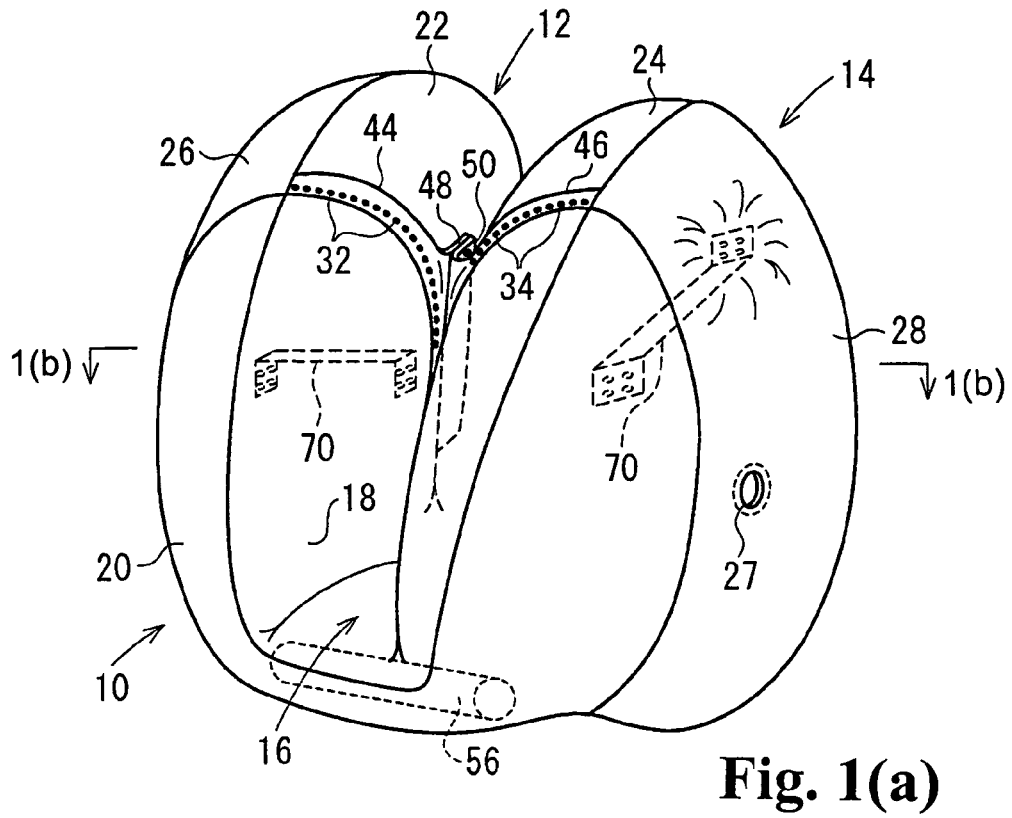
Figure 1B:
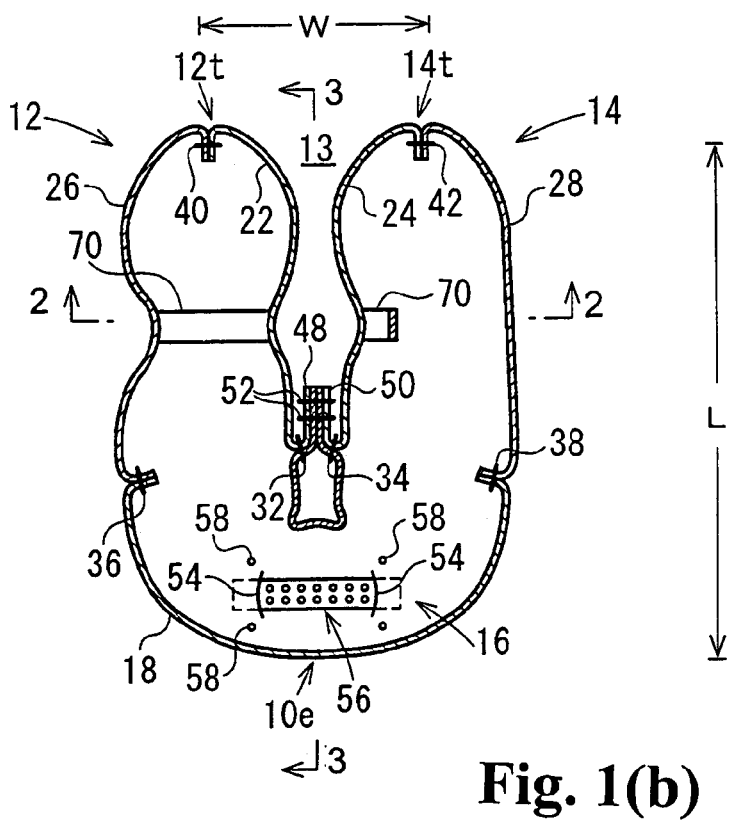
Figure 2:
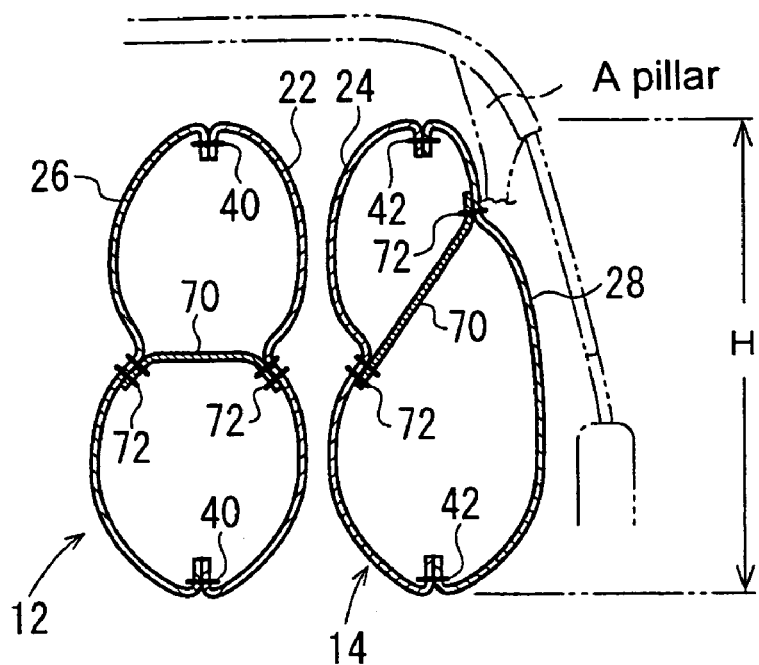
FIG. 2 is a sectional view of the airbag taken along line 2-2 in FIG. 1(b)
Figure 3:
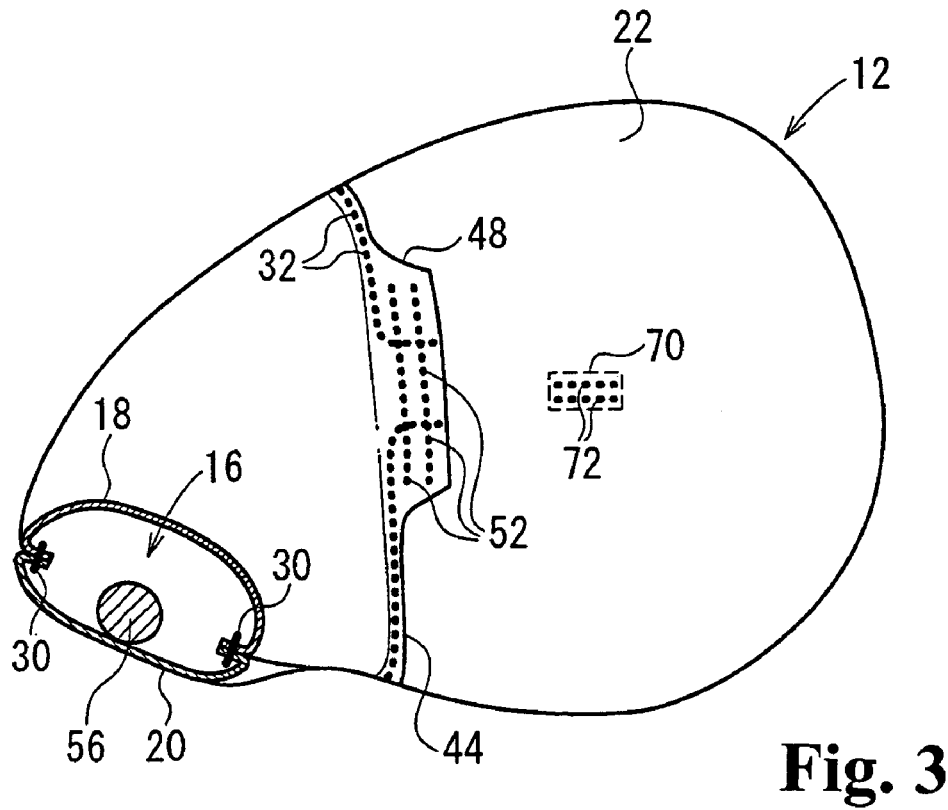
FIG. 3 is a sectional view of the airbag taken along line 3-3 in FIG. 1(b)
Figure 4A:
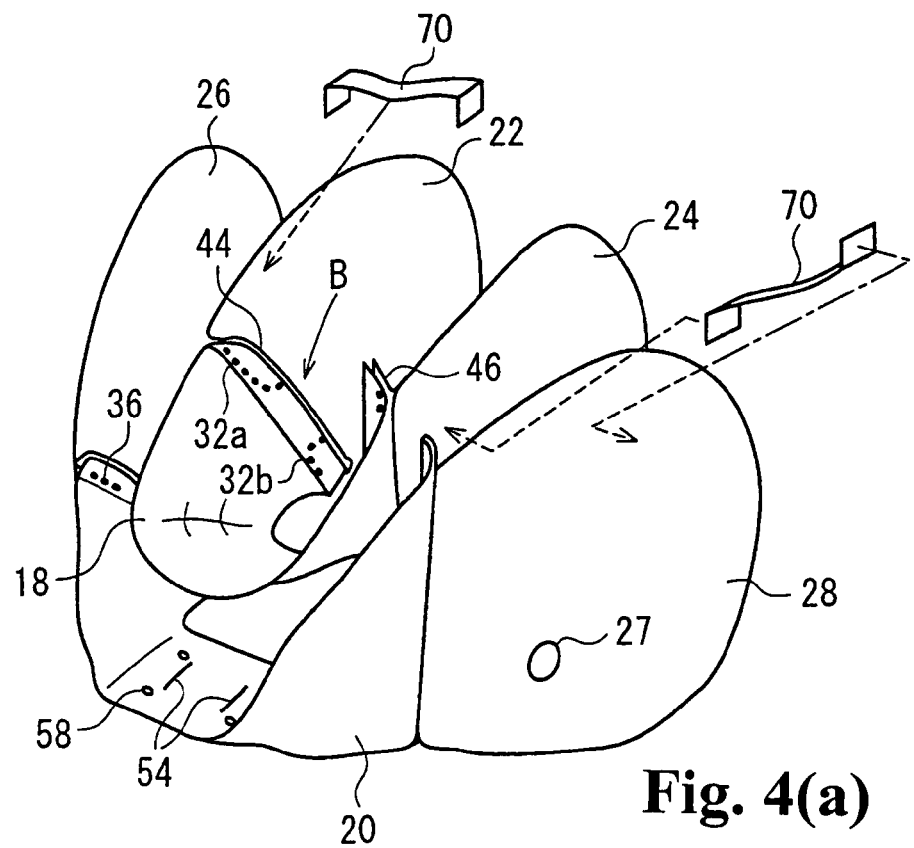
Figure 4B:
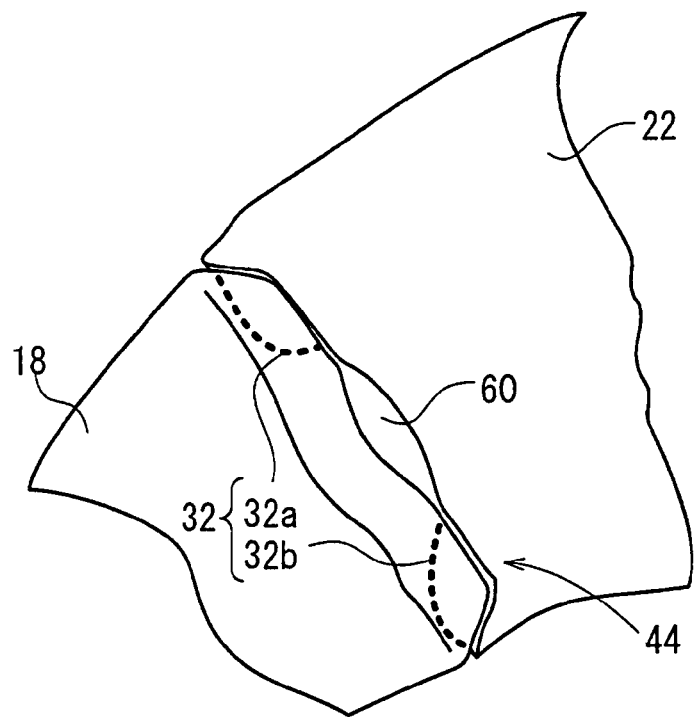

FIG. 1(a) is a perspective view of an airbag in an inflated state according to an embodiment of the present invention. FIG. 1(b) is a sectional view of the airbag taken along line 1(b)-1(b) in FIG. 1(a). FIG. 2 is a sectional view of the airbag taken along line 2-2 in FIG. 1(b). FIG. 3 is a sectional view of the airbag taken along line 3-3 in FIG. 1(b). FIG. 4(a) is an exploded perspective view of the airbag and FIG. 4(b) is an enlarged view of an essential part thereof shown in FIG. 4(a). The airbag is a passenger airbag to be mounted to an instrument panel of a car in which a left front seat is a passenger seat. Hereinafter, a left airbag section and a right airbag section are each sometimes simply referred to as a bag.

An airbag 10 includes a right airbag section 12 that is inflated toward a right front of an occupant (adjacent to the console in this embodiment), a left airbag section 14 that is inflated toward the left front of the occupant (adjacent to the car body, and a communicating part 16 that communicates ends of the right airbag section 12 and the left airbag section 14 with each other. The communicating part 16 constructs a base end of the airbag 10. The bags 12 and 14 each inflate in a direction away from the communicating part 16.

The bags 12 and 14 each include a tether 70 as means for limiting lateral widths of the bags 12 and 14 during inflation. The tethers 70 are joined to front inner panels 22 and 24 and front outer panels 26 and 28 that construct left and right sides of the bags 12 and 14, respectively, with seams 72. The tethers 70 are arranged in the vicinity of the centers of the bags 12 and 14 in the fore-aft direction of the vehicle body. In the right airbag section 12, the tether 70 joins the vertical centers of the panels 22 and 26. In the left airbag section 14, a first end of the tether 70 is joined with the vertical center of the panel 24, and a second end is joined with the upper part of the vehicle-side panel 28. In the left airbag section 14, the first end of the tether 70 may be joined with the lower part of the panel 24.

Figure 5:
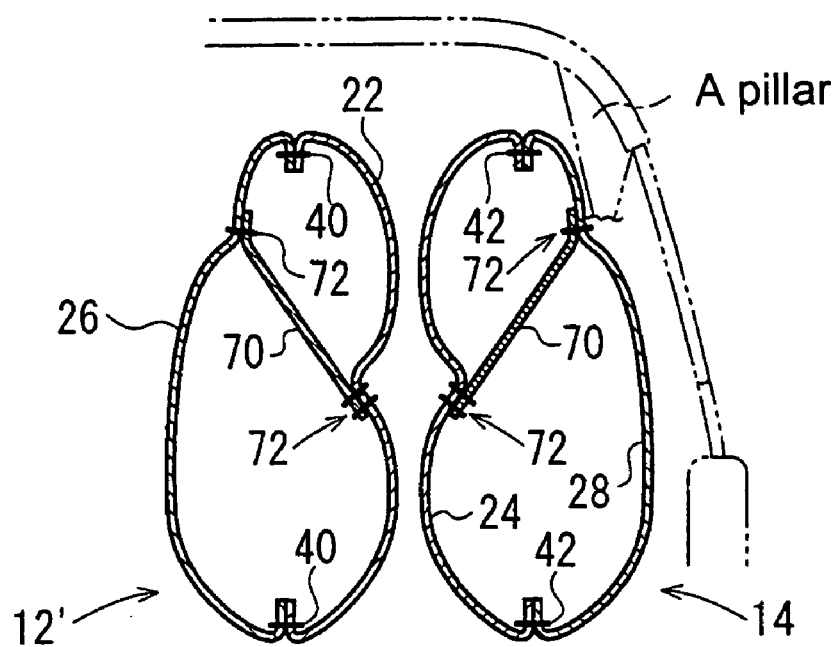
FIG. 5 is a sectional view of an airbag according to another embodiment.

When a longitudinal section (see FIG. 2) of the bag 14 passing through the tether 70 has a height H in a fully inflated state, it is preferable that a position joining between the panel 24 and the first end of the tether 70 is located at 40% to 70% from the highest portion in the longitudinal section. It is also preferable that a position joining between the panel 28 and the second end of the tether 70 is located at 40% to 80% from the lowest part in the longitudinal section. The same applies to a case in which the tether 70 of the right airbag section is inclined, as shown later in FIG. 5.

When the right airbag section 12 and the left airbag section 14 are inflated, the widths thereof are limited by the tethers 70. In the airbag 10, an intermediate portion of the right airbag section 12 in the inflating direction and an intermediate portion of the left airbag section 14 in the inflating direction are joined together with seams 52.

In this embodiment, an outer shell of the airbag 10 is constructed of panels 18, 20, 22, 24, 26, and 28. The panel 18 (rear inner panel) constructs opposing surfaces of the bags 12 and 14 adjacent to the base end and a surface of the communicating part 16 adjacent to the occupant. The panel 20 (rear outer panel) constructs surfaces of the bags 12 and 14 opposite to opposing surfaces thereof and a surface of the communicating part 16 opposite to the occupant. The panels 22 and 24 (front inner panels) construct the opposing surfaces of the bags 12 and 14. The panels 26 and 28 (front outer panels) construct the surfaces of the bags 12 and 14 opposite to the opposing surfaces.

Reference numeral 30 denotes a seam (sewing thread) that stitches up the rear inner panel 18 and the rear outer panel 20 together. Reference numerals 32 and 34 denote seams that sew the rear inner panel 18 on the front inner panels 22 and 24, respectively. Reference numerals 36 and 38 denote seams that sew the rear outer panel 20 on the front outer panels 26 and 28, respectively. The front outer panels 26 and 28 each have a vent hole 27.

As shown in FIG. 1(a), stitching tabs (connecting tabs) 44 and 46 for the rear inner panel 18 and the front inner panels 22 and 24 are disposed such that they are exposed to the outer surfaces of the bags 12 and 14. As shown in FIGS. 1 and 3, tongue-shaped connecting tabs 48 and 50 project from the stitching tabs 44 and 46. The connecting tabs 48 and 50 are stitched up together with seams 52. The rear outer panel 20 that constructs the outer surface of the communicating part 16 has a pair of slits 54 for an inflator to pass through. A rod-like inflator 56 is disposed through the slits 54.

The airbag 10 is manufactured by the following procedure. As shown in FIG. 4(a), the rear inner panel 18 and the front inner panels 22 and 24 are stitched up together with seams 32 and 34, respectively. The rear outer panel 20 and the front outer panels 26 and 28 are stitched up together with seams 36 and 38, respectively. At this time, the stitching tabs 44 and 46 of the rear inner panel 18 and the front inner panels 22 and 24 are disposed in an airbag product such that they are exposed outside the airbag.

In this embodiment, the stitching tabs 44 of the rear inner panel 18 and the front inner panel 22 are stitched up together only at the both ends with seams 32 (32a and 32b), respectively, as shown in FIG. 4(b). Between the seams 32a and 32b, an opening 60 for the airbag to be reversed is formed. Then, the stitched body of the rear inner panel 18 and the front inner panels 22 and 24, and the stitched body of the rear outer panel 20 and the front outer panels 26 and 28 are stitched up together with seams 30, 40, and 42. The both ends of the tether 70 are sewn on the panels 22 and 26 and the panels 24 and 28, respectively, thereby making a reversed intermediate airbag-product.

The intermediate airbag-product is turned inside out through the opening 60 of the connecting tabs 44. Thereafter, the connecting tabs 48 and 50 of the stitching tabs 44 and 46 are stitched up together with seams 52, thus completing the airbag 10. When the connecting tabs 48 and 50 are stitched up together, the opening 60 is closed by the seams 52. The airbag 10 is accommodated in a casing in a folded state and joined to the casing with bolts (not shown) inserted in bolt insertion holes 58 (see FIG. 1(b)). A lid is mounted on the casing so as to cover the folded airbag 10.

The airbag system is mounted to an instrument panel ahead of a passenger seat of a car. In a car crash, the inflator 56 ejects gas to inflate the right airbag section 12 and the left airbag section 14 on the right and left front of the occupant. In the airbag 10, the lateral widths of the right airbag section 12 and the left airbag section 14 in an inflated state are limited by the tethers 70, so that inner volumes of the right airbag section 12 and the left airbag section 14 are relatively low. Accordingly, even if a capacity of the inflator 56 is low, the right airbag section 12 and the left airbag section 14 can be inflated sufficiently early.

In this embodiment, an upper part of the left airbag section 14 adjacent to a car body is pulled inwardly and downward by the tether 70 when inflated. Accordingly, as shown in FIG. 2, it is possible to prevent the upper part of the left airbag section 14 from interfering with an A-pillar and an adjacent windshield, side door, and so forth.

The intermediate portions of the right airbag section 12 and the left airbag section 14 are joined together with the seams 52. Accordingly, even if one of the bags 12 and 14 inflates first and the other inflates later during the inflation of the airbag 10, the first inflating bag starts to pull the other late inflating bag in the inflating direction relatively early after the start of inflation. Thus, the bags 12 and 14 can be inflated smoothly and substantially evenly from the initial stage of inflation.

When the airbag 10 becomes a fully inflated state, a space 13 is produced between the distal ends of the right airbag section 12 and the left airbag section 14. The space 13 is open to the occupant. The inflated right airbag section 12 receives a right chest of the occupant, the inflated left airbag section 14 received a left chest, and the space 13 faces breastbone. Accordingly, a reaction force applied to the breastbones at reception of the airbag is small.

When the airbag 10 becomes a fully inflated state, it is preferable that a distance W between an extreme end 12t of the right airbag section 12 and an extreme end 14t of the left airbag section 14 be in a range from 150 to 450 mm, particularly, from 170 to 430 mm.

In the foregoing embodiments, one end of the tether 70 is joined with the upper part of the outer panel (adjacent to the car body) 28 only in the left airbag section 14. However, the tether 70 may be joined with the upper part of the outer panel 26 adjacent to the console, as in a right airbag section 12' of FIG. 5. With such a structure, the airbag system can be mounted to both a car with a left-hand steering and a car with a right-hand steering. The volumes of the left and right bags may be equal so that the inner pressures during inflation are equal.

Figure 6:
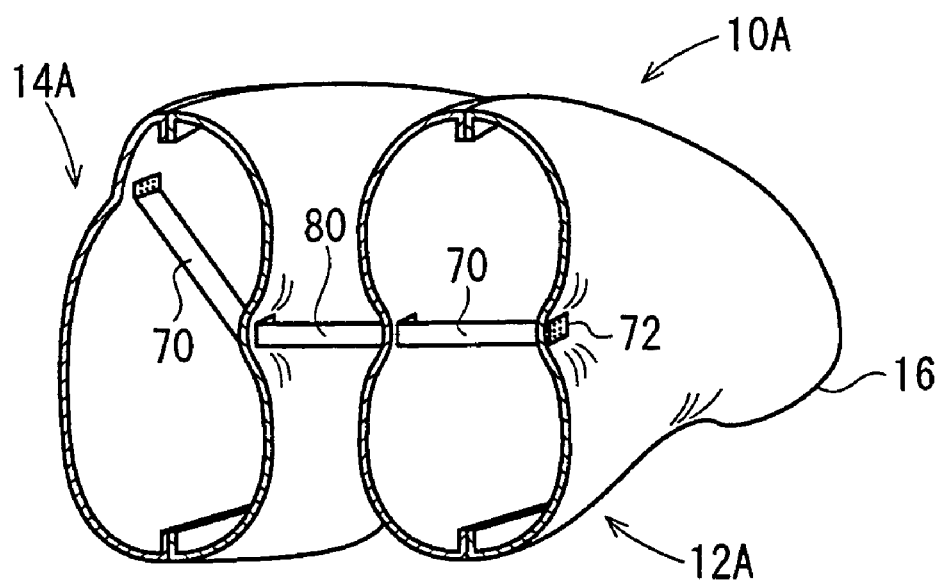
FIG. 6 is a sectional perspective view of an airbag according to a further embodiment.

In the foregoing embodiments, the intermediate portions of the left and right bags 12 and 14 are joined with each other by stitching up the connecting tabs 48 and 50 together. Alternatively, as in the airbag 10A shown in FIG. 6, the intermediate portions of the left and right bags 12A and 14A may be joined with each other with a belt 80. The other numerals of FIG. 6 indicate the same parts in FIGS. 1 to 5. In place of the belt 80, a strap, a net, or a panel may be used.

In the foregoing embodiments, the left and right sides of each of the right airbag section 12 and the left airbag section 14 are joined together with one tether 70. Alternatively, the sides may be joined together with two or more tethers. It is also possible to provide tethers that join the upper surface and the lower surface of each of the right airbag section 12 and the left airbag section 14 to limit the vertical widths of the bags 12 and 14 during inflation.

The above embodiments are only examples of the invention and the invention is not limited to the embodiments in the drawings. For example, although the right airbag section and the left airbag section of the embodiment connect to each other at the base ends, the bags may be separated. The left airbag section and the right airbag section may be inflated by separate inflators.

The disclosure of Japanese Patent Application No. 2004-243936, filed on Aug. 24, 2004, is incorporated in the application.

While the invention has been explained with reference to the specific embodiments of the invention, the explanation is illustrative and the invention is limited only by the appended claims.

What is claimed is:

1. An airbag comprising:
   a left airbag section to be inflated toward a left front side of an occupant and formed of an inner side left portion and an outer side left portion, a right airbag section to be inflated toward a right front side of the occupant, said right airbag section being formed separately from the left airbag section and being formed of an inner side right portion and an outer side right portion, the left or right airbag section being located adjacent to a side of a car body, and left and right width limiting members disposed in the left airbag section and the right airbag section for limiting lateral widths of the left airbag section and the right airbag section when the airbag is inflated, the left width limiting member connecting the inner side left portion and the outer side left portion, and the right width limiting member connecting the inner side right portion and the outer side right portion, respectively, wherein at least one of said left and right width limiting members located adjacent to the side of the car body includes one end connected to an upper part of the outer side portion of the left or right airbag section adjacent to the side of the car body, and the other end connected to the inner side portion opposite thereto, the other end being located lower than said one end in a vertical direction so that the upper part is pulled inwardly and downwardly when the airbag is inflated and the width limiting member with the one and the other ends is disposed obliquely in the vertical direction in an inflated condition.

2. An airbag according to claim 1, wherein said left or right width limiting member located in the left or right airbag section adjacent to the side of the car body includes a tether joining the upper part to an intermediate portion or a lower part on an opposite side of the upper part.

3. An airbag according to claim 1, wherein said left and right airbag sections have distal ends away from each other such that the distal end of the left airbag section is not connected to the distal end of the right airbag section to form a space therebetween facing the occupant when the airbag is inflated.

4. An airbag according to claim 1, wherein said left and right airbag sections have intermediate portions joined together in a direction that the airbag is inflated.

5. An airbag according to claim 1, further comprising a connecting member disposed between the left airbag section and the right airbag section for connecting opposing portions of the left airbag section and the right airbag section.

6. An airbag system comprising the airbag according to claim 1 and an inflator for inflating the airbag.

7. An airbag according to claim 1, wherein the other of the left and right width limiting members located in the left or right airbag section adjacent to a middle of the car body extends substantially horizontally.

8. An airbag according to claim 7, further comprising a connecting member disposed between the left airbag section and the right airbag section for connecting opposing portions of the left airbag section and the right airbag section where the left and right width limiting members are connected to the inner side left and right portions.

9. An airbag according to claim 7, wherein each of the left and right width limiting members is one elongated tether having the one end and the other end.

10. An airbag according to claim 1, wherein the other of the left and right width limiting members located in the left or right airbag section adjacent to a middle of the car body includes one end connected to an upper part of the outer side portion of the left or right airbag section adjacent to the middle of the car body, and the other end connected to the inner side portion opposite thereto, the other end of the other of the left and right width limiting members being located lower than said one end in the vertical direction so that the upper part is pulled inwardly and downwardly when the airbag is inflated and the other of the left and right width limiting members is disposed obliquely in the vertical direction in the inflated condition.

11. An airbag according to claim 10, wherein the left and right width limiting members are arranged symmetrically relative to a plane between the left and right airbag sections.

* * * * *